A. W. PROCTOR, DEC'D.
G. H. PROCTOR, ADMINISTRATRIX.
STOP MOTION FOR HIGH SPEED MACHINES.
APPLICATION FILED DEC. 29, 1915.

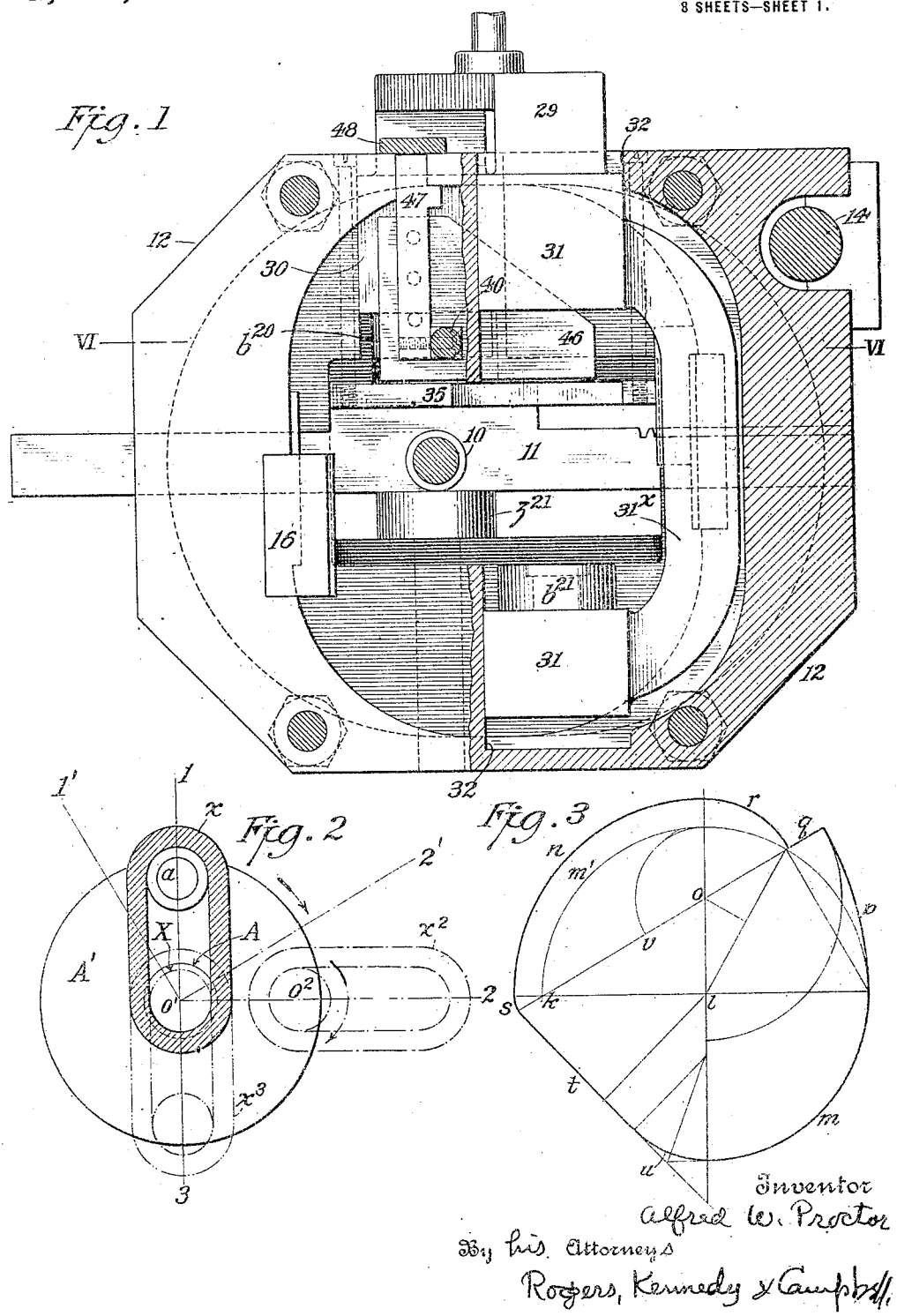

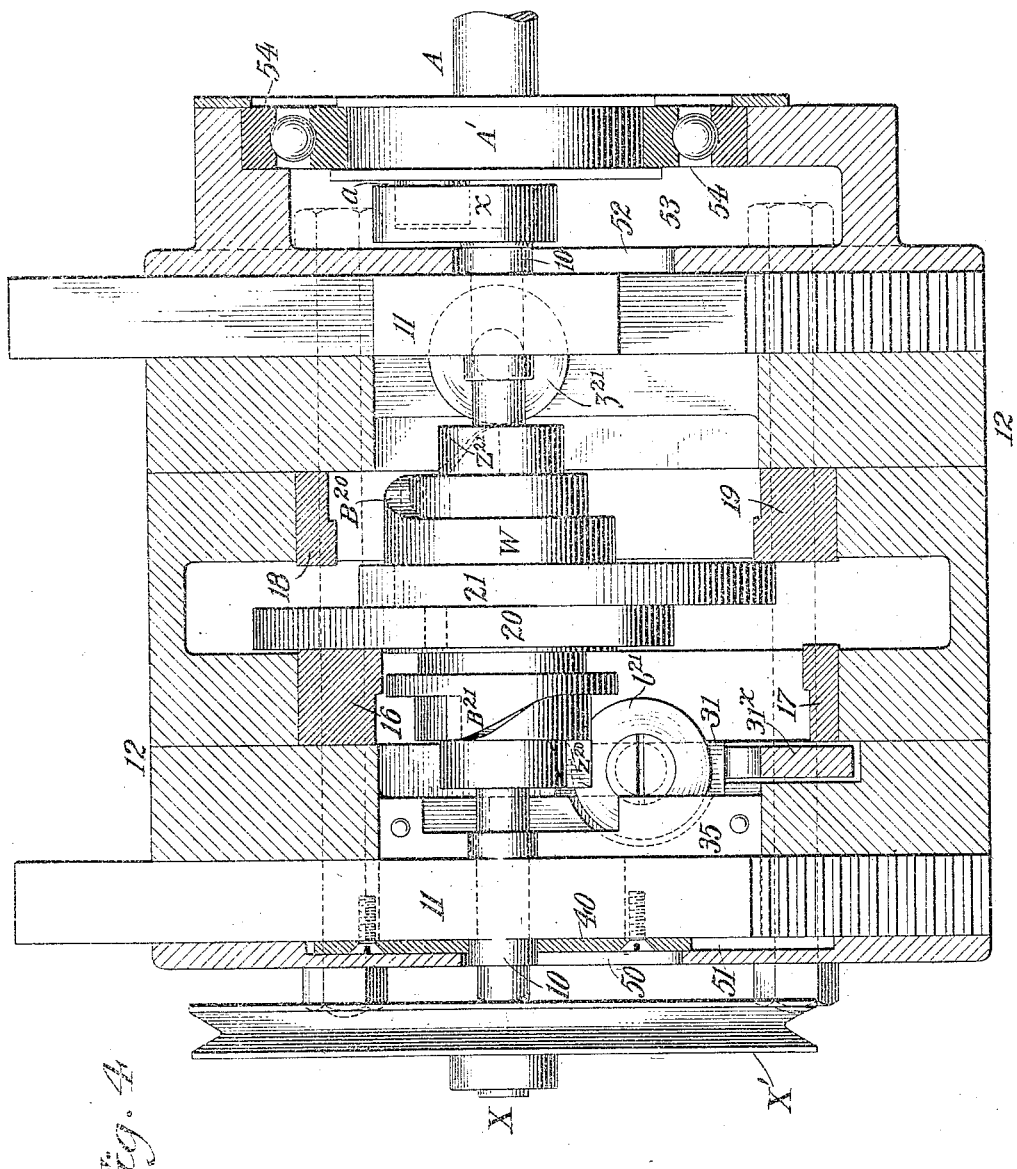

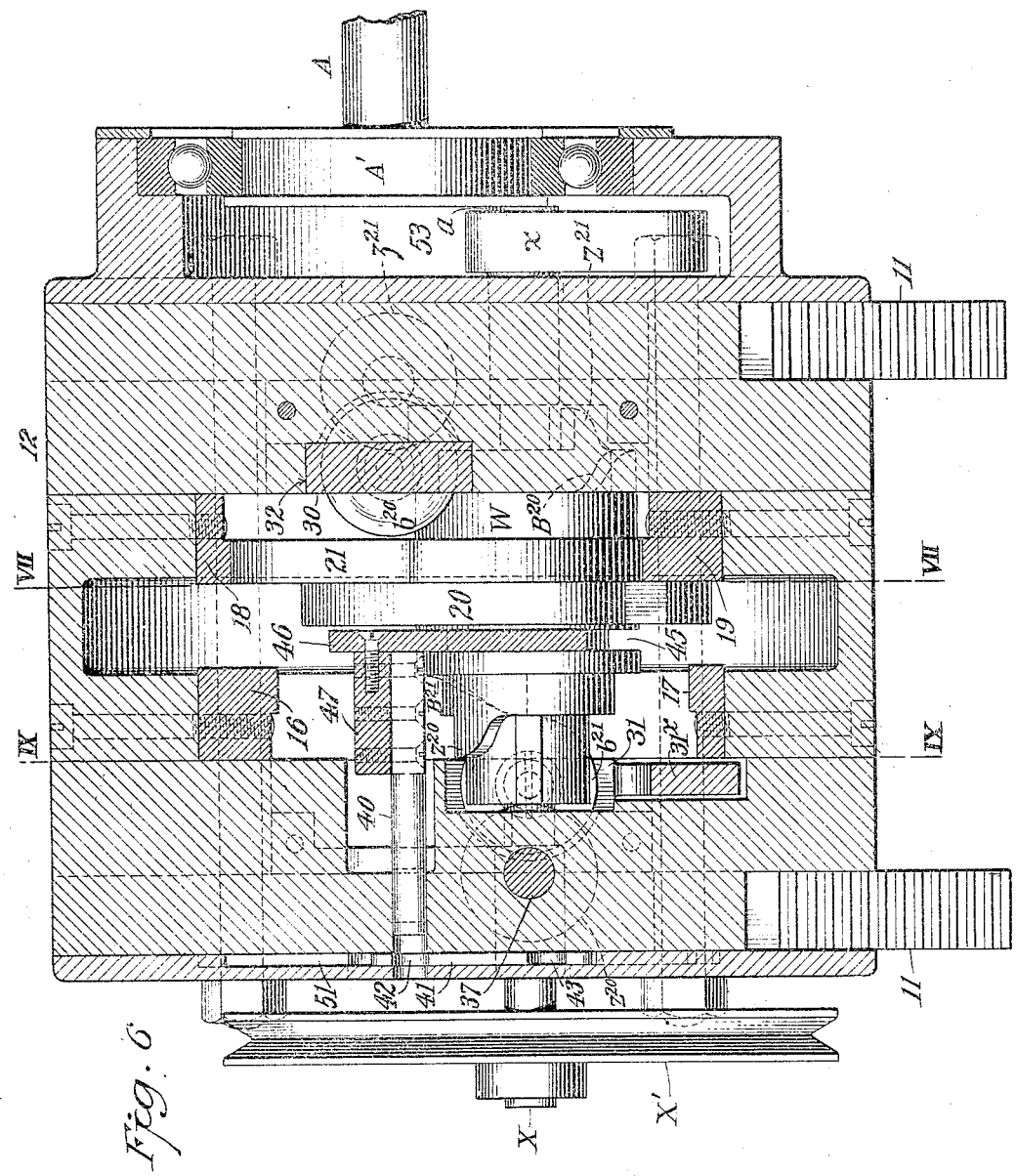

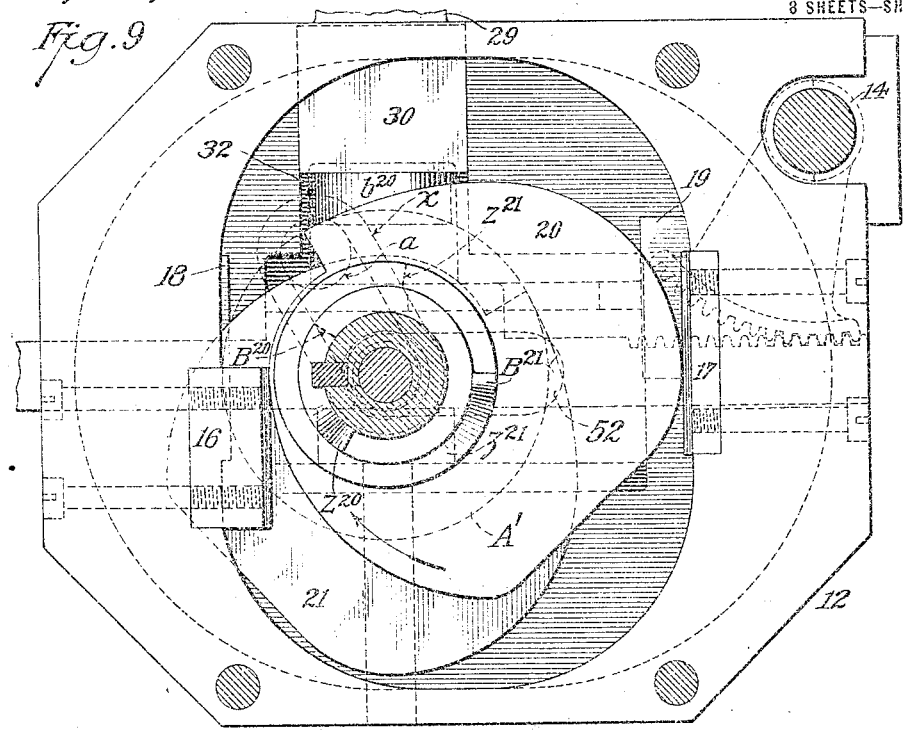
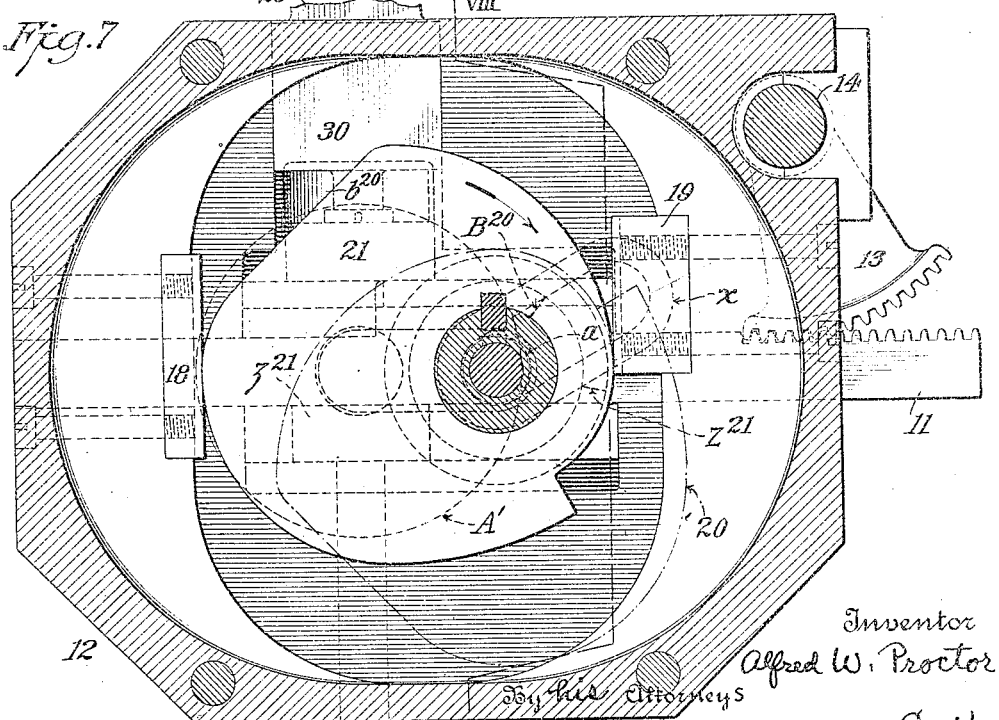

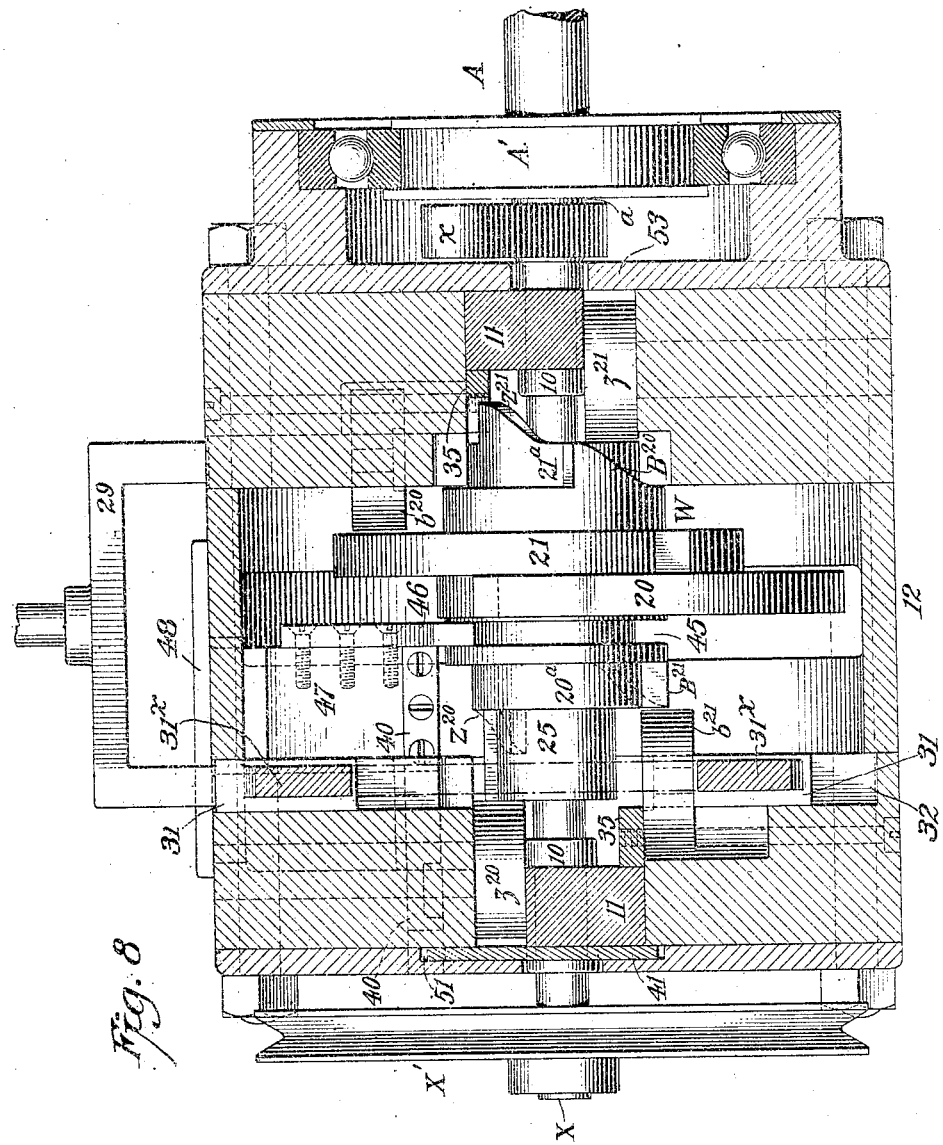

1,246,821.

Patented Nov. 13, 1917.

Inventor
Alfred W. Proctor
By his Attorneys
Rogers, Kennedy & Campbell.

A. W. PROCTOR, DEC'D.
G. H. PROCTOR, ADMINISTRATRIX.
STOP MOTION FOR HIGH SPEED MACHINES.
APPLICATION FILED DEC. 29, 1915.

1,246,821.

Patented Nov. 13, 1917.
8 SHEETS—SHEET 8.

Inventor
Alfred W. Proctor
By his Attorneys
Rogers, Kennedy & Campbell

UNITED STATES PATENT OFFICE.

ALFRED W. PROCTOR, OF BROOKLYN, NEW YORK; GEORGIETTA H. PROCTOR, OF BROOKLYN, NEW YORK, ADMINISTRATRIX OF SAID ALFRED W. PROCTOR, DECEASED, ASSIGNOR, BY MESNE ASSIGNMENTS, TO FRANCIS A. SHEA, OF BOSTON, MASSACHUSETTS.

STOP-MOTION FOR HIGH-SPEED MACHINES.

1,246,821.     Specification of Letters Patent.     Patented Nov. 13, 1917.

Application filed December 29, 1915. Serial No. 69,140.

*To all whom it may concern:*

Be it known that I, ALFRED W. PROCTOR, a citizen of the United States, residing at Brooklyn, in the county of Kings and State of New York, have invented certain new and useful Improvements in Stop-Motions for High-Speed Machines, of which the following is a specification, reference being had therein to the accompanying drawing.

This invention relates to a stop motion for high speed machines, being a device for bringing a rotating shaft in a machine to a condition of rest without shock, further accomplishing this in a brief period of revolution of the shaft and in a very short period of time, and further bringing the shaft to rest in a definite position, angularly considered. Among the principal objects of the invention are the following.

One object of the invention is to absorb the momentum of the rotating shaft, which momentum may be considerable by reason of heavy moving parts in the machine, such as wheels, gears, cams and reciprocating elements, without giving any severe shock to any of the parts of the machine or of the stop motion. It will be understood that either high speed moving parts in a machine or heavy parts in a machine have considerable momentum and inertia, and any attempt to check the motion suddenly may be productive of considerable wear and tear, if not actual breakage.

A further object of the invention is to reduce the speed of the driven shaft automatically; that is, without either more thought or attention on the part of the operator of the machine than moving a handle or pedal, but without any necessity of a sudden or quick movement, or, on the other hand, a slow movement, or any particular kind of controlling manipulation. The attention of the operator of the machine is necessarily largely concerned with its regular purpose of operation, as sewing, printing, or the like, and it is desirable to make the stopping automatic in the sense of being independent of any particular manipulation on his part. Whenever stoppage is desired, a simple manipulation should bring it about, however artless or unskilled or variable such manipulation may be at different times with different operators and under different circumstances of stoppage.

A further object of the invention is to provide for the unvarying stoppage of the machine at a given point of action, corresponding to a given angular position of the driven shaft to which the stop motion is conveniently attached. In a considerable number of arts, as in sewing and printing machines, and in many classes of shoe machinery not particularly connected with sewing, the importance of having the machine stop at a definite position is well understood. The present stop motion is designed to faithfully carry out this service.

A further object of the invention is to secure the stoppage in a very brief space of time and amount of revolution, it being evident that any continuing period of running with reducing speed is productive of loss of time, and some uncertainty in the final point of stoppage which must be estimated by the operator in advance. In accordance with the present device, stoppage is effected in a fraction of a revolution of the driven shaft.

Another object of the invention is to effect starting of the machine to which the stop motion is connected in a prompt, smooth way without shock, and automatically in a manner quite similar in nature, though the effects are oppositely directed, to the stopping.

In addition to the foregoing general objects, the present invention is directed to a device of considerable mechanical strength and durability which shall be free from dependence on the uncertain action of any springs or like devices liable to varying degrees of tension and breakage, and liable to uncertain action from the effects of gummy oil, or temperature of the air. And in addition to this it is one of the important aspects of the present invention to avoid the use of any brake or reliance upon the uncertain effects of frictional sliding, which vary greatly from the effects of wear, pressure, dampness, minute specks of oil, rust and different and innumerable causes. In other words, the present invention is designed to be, so far as possible, absolutely independent in its action of any devices capable of uncertain action, such as have been enumerated, or other forces like gravity, or even momentum. The present device is adapted to secure the control of the driven shaft by the inherent strength of its materials as driven through the power of the prime power source or engine. Thus, the proper action is insured except for the possibility of actual breakage of the parts, which, however, may be made so strong as to preclude breakage. In this way the stop motion is made sufficiently proof against supervision that it may be put out attached to a machine for long periods of service without any attention, or even knowledge of its action, by the user of the machine. As a further part of this object the stop motion is made compact and strongly housed with all the working parts inclosed, and running in the grease or oil which is contained within the casing and which will remain without replenishing for a long period, like the grease in a familiar automobile differential or gear box. A still further object of the invention is to make all the parts, so far as possible, interlocking, so that no accidental cause can produce any improper movement. By accidental causes one might imagine a backward turning of the machine, or a sudden heavy overload, due to the machine being suddenly arrested by being clogged. These accidental causes might produce abnormal tendencies to action in the stop motion, and the latter is, therefore, made entirely interlocking throughout to forestall any improper action from this cause.

Other objects are to provide a stop motion which is readily adaptable to a wide range of machines, i. e., to extremely rapid rotation as with buttonhole sewing machines, or to comparatively slow machines, if desired, which may have much heavier parts, thereby having considerable inertia in spite of the slow speed. It is a further object to provide a device which has only a few necessary parts, which are inherently strong so as not to require highly refined materials and construction.

With these objects in view the improved stop motion consists in the features of construction and combination hereinafter pointed out.

In the drawings it will be understood that the stop motion is connected to a machine at the shaft A, this being the shaft in the machine which is to be started and stopped, as above described, and which shaft has been known in the stop motion art as a driven shaft in the machine. X' is a driving pulley which rotates continuously as by connection with a line shaft in the factory or with an electric motor, and corresponds to what is known in the stop motion art as the driving shaft.

Figure 1 is a side elevation, viewed from the pulley side, with the cover plate at this end, and also the rotating parts, removed, and further partly in section, of a stop motion embodying the principles of this invention.

Fig. 2 is a diagrammatic view illustrative of some of the main principles of the action.

Fig. 3 shows the outline of a form of cam which may be advantageously used.

Fig. 4 is a top plan view of the casing and certain parts in section, and particularly showing the rotating parts in their normal position while the machine is running, of the stop motion of Fig. 1.

Fig. 6 is a sectional view looking downward on the general plane VI—VI of Fig. 1 and showing the parts in one phase of the starting action, i. e., about 60° after the initial commencement thereof.

Fig. 7 is a section taken on the line VII—VII of Fig. 6, the parts being in the same position.

Fig. 8 is a section on the line VIII—VIII of Fig. 7 looking in the direction of the arrow.

Fig. 9 is a section through the casing on the line IX—IX of Fig. 6, but the movable parts are in the phase corresponding to the stopping of the machine, i. e., 60° after the initial commencement thereof.

Figure 5:
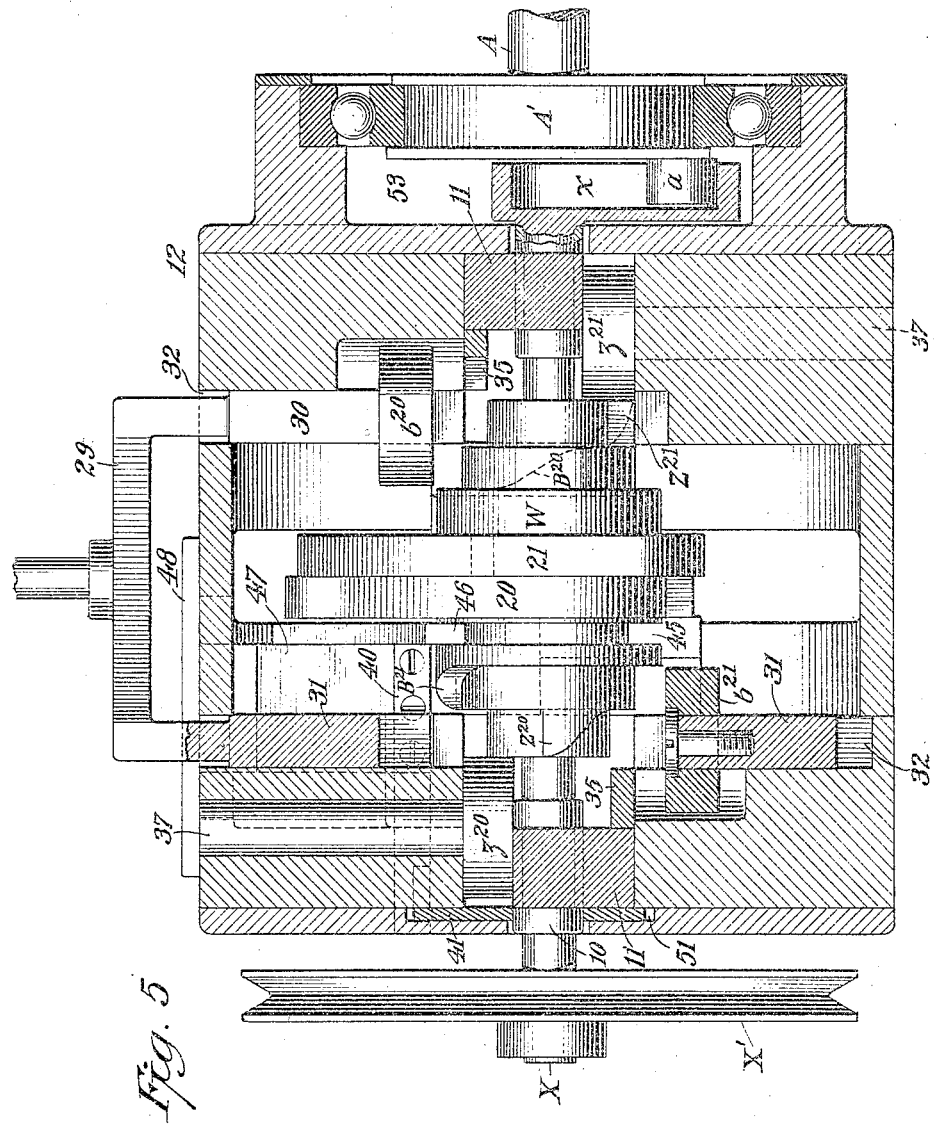
Fig. 5 is a vertical sectional view of the same.

Reference being had to Fig. 2, it will be understood that this is a diagrammatic view in which A' indicates a crank disk on the driven shaft A and having a crank pin $a$. The crank pin $a$ works in an oval or slotted link or crank $x$, which is fixed to or integral with a part of the driving shaft X and pulley X'. These features, being somewhat primary in the operation of the stop motion, will receive first attention as to their operation, after which the further details can be more readily understood.

The slotted link $x$, which, of course, may have any convenient practical form to perform the functions hereinafter described of a slotted link on the driving shaft, may rotate on an axis which is coaxial with the driven shaft A, this being the condition in full lines in Fig. 2. Under these conditions the driving pulley and shaft X rotate the link $x$, and this in turn carries around the crank pin $a$, which, being a part of the driven shaft A, revolves the latter. The arrangement is, in fact, a direct connection or coupling between the driving and the driven shafts, and the latter is rotated with the whole power of the engine through this direct mechanical connection. This rotation will continue as long as the driving and driven shafts maintain this concentric or "axial" relation to one another. If, however, at the instant when the parts are in the position shown in Fig. 2 in full lines, i. e., with the crank $a$ and slotted link $x$ extending in the vertical direction marked 1, an action is brought about by which the axis of the driving pulley and shaft X will be moved toward the right, or in the direction marked 2, and at such a speed that the slotted link $x$ reaches the position shown in dot-and-dash lines $x^2$ at the time it extends in direction 2, it will be found that the driven shaft has during this interval been completely brought to rest. It will be found that the driven shaft has further been brought to rest by a gradual motion which is substantially harmonic or ideal in character, that is to say, by such a motion as gives the quickest possible stoppage with the least possible shock or wear and tear. This will be understood by those familiar with mechanics, being a motion known as a gradually accelerated or retarded motion, which is adapted to produce very quick stoppages of parts having high momentum or inertia without there being any shock, or sound, or wear and tear resulting therefrom. If the slotted link $x$ continues to rotate on the new axis $o^2$, it may do so continuously and at its original speed of rotation, but the driven shaft will not be driven. On the contrary, the driven shaft will be held locked at its position of stoppage, which is a position where the crank $a$ is held fixed at the location $o^2$. Thus, the complete action has been a prompt termination of the rotation of the driven shaft, but without any shock, the cessation of motion being by gradual stages, as explained. The driven shaft is further brought to a stop in a definite position. On the other hand, the driving shaft has not ceased its uniform rotation, but continues to rotate with unimpeded velocity, as before, as is its nature, being driven by the engine or line shaft in the factory, which is not adapted to stop or have any varying movement. The only change that needs to be mentioned is the change of location of the driving shaft and pulley X', this having been shifted from the axis $o'$ to the axis $o^2$.

It now being understood that the driven shaft is stopped, starting is effected by a procedure which is analogous to the stopping, but reversely directed in its effects. From the position $x^2$ the link $x$ is supposed to be moved to the position $x^3$, by which its axis of rotation moves back from $o^2$ to $o'$, while it is traversing about 90° to a position 3. By this action the first considered relations are restored and the driven shaft is directly coupled to the driving shaft and it continues to rotate as long as this coupling is continued. Thus, the machine is started in a prompt, but gradual, manner, having similar principles of quietness and freedom from shock to the stopping action.

All this general principle of stop motion now being familiar, it can be stated that the main portion of the mechanism, as hereinafter described, is concerned with securing the motion of the pin $a$ and the link $x$ as described. One modification requires mention, however, in that, instead of the commencement of the stopping action being at the angle marked 1, a start is made 30° earlier at the angle marked 1'. Similarly, instead of the commencement of the starting being at the angle marked 2, the commencement is made 30° earlier or at the angle marked 2'. This is done to secure slightly more time and opportunity to get the parts in proper relation before the proper action really begins. It will be found that this advance of 30° in each case does not sensibly alter the relations as already described, for the reason that 30° is not angle enough to make any particular difference in this action, either from the standpoint of stopping the driven shaft or starting it. By advancing the angle 30°, however in each case, there is a range of 120° instead of 90°, during which both the starting and stopping of the driven shaft takes place. In addition to this period of 120°, there is a further interval of 90° added on, as will be later described, 60° being added on at the inception and 30° at the conclusion of both starting and stopping actions. Thus, in the practical embodiment herein illustrated of this invention the whole action of the stop motion from its initial inception to its final conclusion occurs in a period of 210°, or 30° more than half the revolution of the driving shaft. These various figures are not in any way controlling, since they may be varied, but they are expressive of the best constructions embodying the invention and true of the particular form of construction hereinafter described.

In the best constructions embodying the invention the driving shaft is swung or moves to and fro from an axis $o'$ to an axis $o^2$, and vice versa, as above described, this motion being readily accommodated by having the run of the driving belt at right angles to the direction of swing or movement of the driving shaft between these two axes.

As particularly illustrated, the driving shaft X is mounted at each end in bearings 10 forming part of sliding bars 11 guided in the frame or casing 12. The bars 11 are coupled or synchronized to move always together by being connected across as by the gear segments 13 on a cross shaft 14, (see particularly Figs. 6, 7, 9 and 14). In this way the bearings 10 of the driving shaft X are kept in alinement with one another at all times. Any force moving the driving shaft to or fro will be transmitted through the sectors 13 so as to move both bearings together in every case, and the shaft will always be in a condition of parallelism in the casing regardless of the forces put upon it to move it or hold it stationary.

The shifting of the driving shaft from the center $o'$ to the center $o^2$, Fig. 2, and back again to secure the results already described is done by the machine itself. While the constructions for accomplishing this may vary, the best constructions embodying the invention will include a cam or cams on the driving shaft. These cams will coöperate with any suitable wear plates or relatively fixed cheeks, which at certain times are brought in proper relation or coördination to the cams to cause a movement of the driving shaft from one axis to another. While it is largely immaterial in some respects whether the cheeks or the wear plates are shifted into and out of the path of the cams, or whether the cams are shifted back and forth into and out of the plane of the wear plates, or some other means used to bring about proper coöperation at the proper time, greater convenience and compactness is secured in most cases by having the cheeks or wear plates permanently stationary in the frame or casing of the stop motion, and having cams on the driving shaft which rotate therewith and are splined thereto so as to have a longitudinal movement on the driving shaft at certain times. By bringing about this longitudinal movement at the proper time the cams are so positioned in relation to the stationary cheeks or wear plates as to shift the driving shaft from one axis $o'$ to the other axis $o^2$, (see Fig. 2), and conversely, as required.

Figure 10:
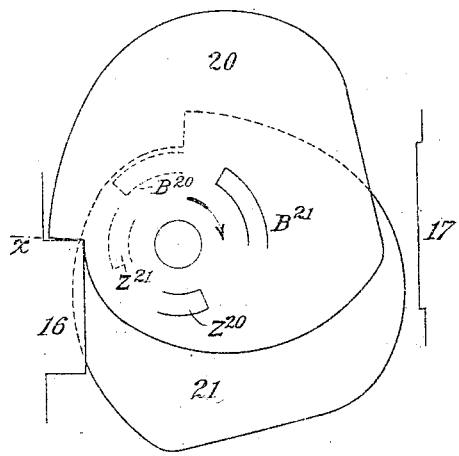
Fig. 10 is a diagrammatic view which may be taken to supplement Fig. 9, being the position of the parts 60° earlier or at the original inception of the stopping action of the machine.
Figure 11:
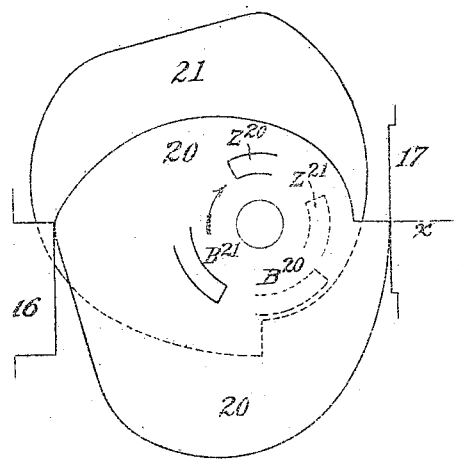
Fig. 11 is a diagrammatic view which may be similarly taken to supplement Fig. 9 showing the position of the parts 120° later than Fig. 9, or when the stopping has been fully brought about. The stop motion parts are, however, not fully brought to normal position in Fig. 11, which occurs within the next 30° of rotation.

In the drawings a set of permanently stationary cheeks or wear plates, such as just referred to, are designated 16, 17, 18 and 19, the pair 16, 17 coming into use in conjunction with the cam 20, as shown in Figs. 9, 10 and 11, while the pair of cheeks 18 and 19 come into coöperation at times with the cam 21, as shown in Figs. 6, 7, 8, 12 and 13. Figs. 4 and 5 show an intermediate condition where the cams 20 and 21 are neither one in contact or capable of rotating in contact with either set of cheeks or wear plates. This is the normal condition of the mechanism, corresponding to constant driving of the machine, or to the stopped position of the machine which is driven. In other words, the position of the cams where they are out of line with the wear plates, as shown in Figs. 4 and 5, is the normal condition whether the driven shaft is being driven or being held stationary, and whether the driving shaft is rotating on the axis $o'$ or $o^2$ of Fig. 2. The engagement of the cams 20 and 21 with the various cheeks 16, 17, 18 and 19 is only had momentarily while the driving shaft is being shifted from one axis $o'$ to the other axis $o^2$, or vice versa. As soon as the shift has been made, the cams return to their normal or intermediate position in the middle of the casing, as shown in Figs. 4 and 5, and retain this position until called upon to shift the driving shaft to its new axis, at which time they momentarily engage the appropriate cheeks and then immediately return to the central normal position.

In the foregoing description the cams 20 and 21 have been referred to without being specifically described as to form and construction. As already stated, it is not essential that the cams slide back and forth longitudinally of the driving shaft, as above indicated, and it is further not essential that they have any particular outline, as shown in the various figures of the drawings, and particularly in Fig. 3. For example, it is possible under certain conditions to use simple eccentrics or circular cams, in which case they can be advantageously given a period of action of 135° in conjunction with the wear plates. But the form of cam illustrated in Fig. 3 has many advantages, and, as these go to the smooth running of the mechanism and also to its convenient and durable construction, they may be said to constitute one of the features of the invention. The form of cams provided secure an engagement with both cheeks of a pair simultaneously while in action and maintain this engagement through the entire period of the shifting of the driving shaft from one axis to another. Thus, the driving shaft in its movement from one axis to another is positively controlled and it is not possible for the driving shaft to rattle or have any improper movement by accident, such as might occur in a case where only a cheek on one side was in engagement at a time. Both cheeks are in active position at every instant while the driving shaft is being actually shifted, so that its movement is controlled with mechanical exactness. Furthermore, this movement is so contrived by the cams that it starts at zero velocity, mounting by true harmonic motion to a fixed maximum, and then immediately reversing, but without change of velocity at the moment of reverse, or in any abrupt way, then descending by true harmonic motion again to zero. Thus, there is no shock commencing the translation of the driving shaft from one axis to the other, and no shock at the cessation of the increase of velocity and commencement of decrease, and finally no shock at the last instant where the driving shaft arrives at its second axis. This is to be regarded as an important point, inasmuch as a motion which lacked these characteristics in any one of the points just mentioned would mean a shock or blow in the device at such a time, when the stop motion was used with a high speed machine. This shock, of course, would not be due to any change in angular rotative movement of any of the parts, but rather to too sudden change of the motion of translation of the driving shaft from one axis to the other. By the form of cam illustrated in Fig. 3, any liability of shock from this cause is utterly overcome. This is also true because the motion is a true harmonic motion at every instant. It is well known that harmonic motion is practically identical with a uniformly accelerated and retarded motion.

The axis of rotation of the cams 20, 21 is at the point $o$, (see Fig. 3), which is one angle of a 30°-and-60° triangle $okl$. The center $l$ is the center of curvature of the quadrants $m$ and $n$ of the cam, the radium $lm$ being furthermore equal to the base $lk$ of the triangle. A third portion $p$ of the cam has the center $k$ and the radius $kp$. A fourth portion $q$ is in line with the side $ko$ of the main triangle first described. The portion $r$ is concentric with the axis $o$ and merges into tangency with the portion $n$. The portion of the cam $s$ is an arc around the center $k$ and tangent with the surface $n$. The flat face $t$ of the cam is or may be a 45° flat face tangent with the portion $s$. The final face $u$ is a simple arc joining by tangent relation to each of the portions $t$ and $m$ of the cam. Under these conditions it will be found that a circle about the center $o$, which is tangent to the circle $m$ or $m'$, cuts the line $ko$ at the point $v$, and the distance $kv$ is the throw of the driving shaft which is secured by this form of cam. In other words, the distance $kv$ is equal to the distance between the centers $o'$ and $o^2$ of Fig. 2. This form of cam gives all of the results as to 120° of active operation and the start with zero velocity, the stop at zero velocity and the mergence at common velocity of the accelerating and retarding curves, which was first described above as desirable.

Reference now being had to the Figs. 9, 10 and 11, the general action of the cam just described may be conveniently observed. It must be assumed that the cam has been somehow brought into such a plane as to co-operate with the cheek or wear plate 16, as shown in Fig. 9. At this instant, as shown in Fig. 9, the cam becomes effective to force the driving shaft bodily in its movement of translation to the right. It should, therefore, at this time have attained a good firm engagement with the cheek or wear plate 16. This is accomplished by an action for the 60° of rotation of the driving shaft which has just been completed in Fig. 9; in other words, with that period which has its commencement in the position of Fig. 10. In other words, between the conditions of Fig. 10 and Fig. 9, the cam 20 has been shifted laterally of itself, or longitudinally on the driving shaft X so as to be brought opposite the cheek or wear plate 16. This lateral shift occurs during 60° of rotation of the cam, starting with that position shown in Fig. 10 and ending with that position shown in Fig. 9. Fig. 9 commences the further movement of the cam, which exerts definite pushing force against the cheek 16 and continues for a period of 120°, or until the position shown in Fig. 11. At this time the translation of the driving shaft to its new axis $o^2$ is accomplished. This will be seen by comparing Figs. 10 and 9 with Fig. 11. It does not appear to be necessary to analyze the curves of the cam in conjunction with the cheeks to show that the starting from zero and stopping at zero velocity and mergence of accelerating and retarding curves at a common velocity, as above explained, is accomplished, as this may be done by consideration of ordinary mathematical principles.

The cam 20 has completed the pushing over of the shaft X to its new position in Fig. 11, but must be given a return lateral movement, or, in other words, a movement longitudinally of the driving shaft X, so that its further rotation will not make it further engage the cheeks 16 and 17. This lateral movement of the cam is completed during the next 30° of rotation after the position of Fig. 11, and this shifting may be advantageously started a little before the position of Fig. 11 to insure greater smoothness and quietness in throwing the cam laterally to the extent desired in the interval available. It will be noted from the dotted representation of the link $w$ in Fig. 9 that this position corresponds to the direction marked $1'$ in Fig. 2, which was described as being the position of the link when the stopping action of the mechanism commenced. Fig. 10 is a position 69° earlier than direction $1'$ of Fig. 2, and Fig. 11 is a position corresponding to where the link just arrives at the position of stoppage, direction 2 of Fig. 2 and marked $x^2$ thereon.

Figure 12:
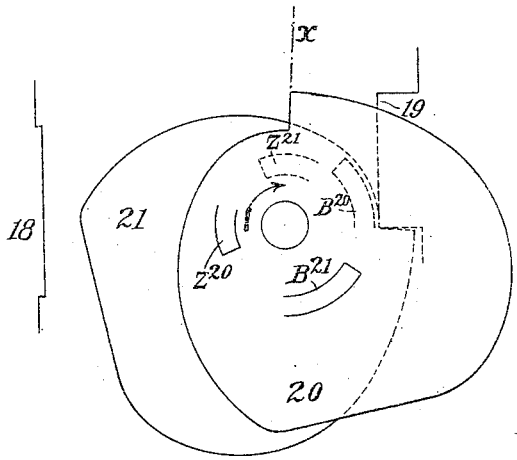
Fig. 12 is a diagrammatic view which may be taken to supplement Fig. 7, being the position of the parts 60° earlier or at the original inception of the starting action of the machine.
Figure 13:
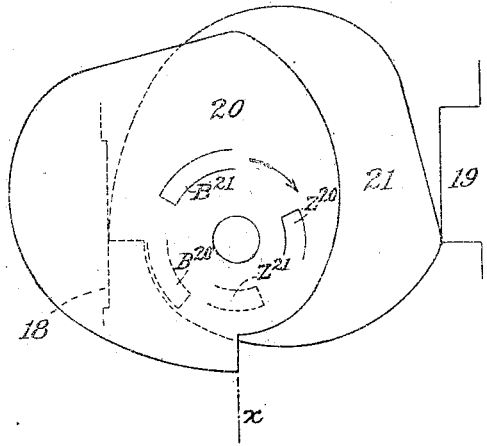
Fig. 13 is a diagrammatic view which may be similarly taken to supplement Fig. 7, showing the position of the parts 120° later than Fig. 7, or when the starting has been fully brought about. The stop motion parts are, however, not fully brought to normal position in Fig. 13, which occurs within the next 30° of rotation.

With the foregoing analysis of the stopping action secured by the cam specifically shown in the drawings, the starting may be readily analyzed without specific description from Figs. 7, 12 and 13. Fig. 7 shows the position of the cams when the actual pushing of the shaft from center $o^2$ to center $o'$ commences. The other cam 21 is now involved, while the cam 20 is entirely out of action for the moment. It is also the other pair of cheeks or wear plates 18, 19, which are brought in use. In fact, in the construction as described, which is the best construction, the lateral shifting of the pair of cams is in a direction on the shaft X away from the pulley end, which movement is particularly illustrated in Figs. 6 and 8. This movement is directly opposite to the movement of the pair of cams when stopping the machine, the latter movement being toward the pulley end, but not specifically illustrated by any side elevational view. It may, however, be readily understood in view of Figs. 4 and 5, which show the central or normal position of the pair of cams, and from which position they may move either toward the left or toward the right for stopping or starting the machine, respectively, as the case may be. When in action for starting, the commencement of the real starting operation is the position shown in Fig. 7, where the cam 21 begins to push the driving shaft toward its new axis, and which is further the position marked by the direction $2'$ in Fig. 2. The lateral shifting occurred in the interval 60° prior to this, namely, the interval between the position of Fig. 12 and that of Fig. 7. The driving shaft is fully pushed over 120° after the position of Fig. 7, which is the position of Fig. 13. After this there is a further period of 30° available for a return shifting of the cams to the central or neutral position of Figs. 4 and 5.

Thus it will be understood that, after the driving shaft X is in alinement with the shaft A, as shown in Fig. 4, the mechanism may be actuated to stop the rotation of the driven shaft A by throwing the pair of cams 20 and 21 to the left in Fig. 4, which brings the cam 20 in conjunction with the cheeks or wear plates 16, 17. This results in a translation of position of the driving shaft X from axis $o'$ to axis $o^2$ in Fig. 2, as particularly illustrated in Figs. 9, 10 and 11. Similarly, if the driving shaft is in the position of Fig. 7, which is the position where the driven shaft is held stationary, as well shown in Figs. 2 and 7, a starting may be effected by shifting the pair of cams 20 and 21 to the right in Fig. 4. This causes engagement of the cam 21 with cheeks or wear plates 18, 19, as particularly shown in Figs. 7, 12 and 13, and further results in a translation of driving shaft X from the axis $o^2$, Fig. 2, to the axis $o'$. The shifting of the cams 20 and 21, both for bringing them into engagement with the cheeks or wear plates, and out of engagement with the cheeks or wear plates, is accomplished automatically by the machine, in the best constructions embodying the invention and as illustrated in the drawings.

Figure 15:
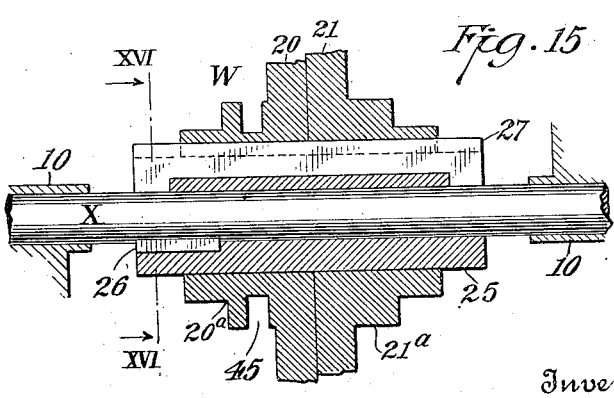
Fig. 15 is a longitudinal sectional view through the main cams of the machine showing the driving shaft in side elevation, and particularly showing the arbor on which these cams slide longitudinally of the driving shaft in splined relation thereto.

While the constructions for this purpose may vary considerably, a simple, practical arrangement is that best understood from Fig. 8. It will be observed that the cams 20 and 21 have hubs $20^a$ and $21^a$, preferably integral therewith, so that the two cams 20 and 21 and their respective hubs $20^a$ and $21^a$ are always in effect an integral unit. This is further illustrated in Fig. 15. This unit slides en masse on arbor 25, which is keyed or secured to the shaft X by any suitable key 26, (see Fig. 15). The arbor 25 has a non-cylindrical form as by key or spline 27, so that the whole cam unit, which for convenience may be designated W, can slide longitudinally on the shaft X, but always rotates therewith. The provision of the arbor 25 is merely for the purpose of securing a greater wearing service and facilitating assembling, it being evident that the cam unit W could be splined directly to the shaft X, if desired.

Referring again to Fig. 8, the hubs $20^a$ and $21^a$ of the cam unit W are illustrated as being provided with certain endwise acting or wedge cam faces, which are further illustrated in Figs. 10, 11, 12 and 13, and which are marked $B^{20}$ and $Z^{20}$, and $B^{21}$ and $Z^{21}$, respectively, the pair $B^{20}$ and $Z^{20}$ appertaining to the cam 20 for shifting it into and out of stopping position, respectively. On the other hand the pair $B^{21}$ and $Z^{21}$ appertain to the cam 21 for shifting it into and out of starting position, respectively.

These cam wedges acting endwise on the cam unit W coöperate with certain abutments or rollers so disposed that each of the cam wedges $B^{20}$ and $Z^{20}$, and $B^{21}$ and $Z^{21}$, may coöperate with an individual one of the four rollers, but with no other. In other words, each roller appertains to a certain cam wedge, and vice versa, and no roller or wedge can have action except in conjunction with its own particular coöperating part. This being true and for convenience in tracing the motions, the rollers are designated $b^{20}$ and $z^{20}$, and $b^{21}$ and $z^{21}$, which may be conveniently compared with the respective cam wedges $B^{20}$ and $Z^{20}$, and $B^{21}$ and $Z^{21}$. In Fig. 8 it will be seen that the cam wedge $B^{21}$ has just been engaged with the roller $b^{21}$, the highest part of the wedge now being opposite the roller. This corresponds with the position of the parts in Fig. 7, and represents the instant when the movement of translation of the shaft X from the center $o^2$ to the center $o'$ begins for the purpose of starting the machine. It will be observed in Fig. 6 that the cam 21 is in the plane of the cheeks or wear plates 18 and 19. The rotary motion of the cam 21 continues until the condition of Fig. 13, at which time the cam wedge $Z^{21}$ arrives opposite the permanently located roller $z^{21}$, whereupon the cam unit W is thrust back to its middle or normal position, as shown in Fig. 5. From a similar consideration of Figs. 9, 10 and 11 it will be seen that the cam $B^{20}$ (see Fig. 10) is adapted to engage the roller $b^{20}$ (see Figs. 5, 6 and 8) about 60° prior to the position of Fig. 9, so as to thrust the cam 20 fully into the plane of the cheeks or wear plates 16, 17 when the slotted link $x$ has arrived in the position of Fig. 9. This represents the instant when the driving shaft X is begun to be thrust from the axis $o'$ to the axis $o^2$ for the purpose of stopping the machine. When the parts have further rotated to the position shown in Fig. 11, which is 120° later than Fig. 9, the cam $Z^{20}$ has been brought into engagement with the roller $z^{20}$ (see Figs. 5, 6 and 8), and the cam unit W is thrust back again into its central or normal position, as shown in Fig. 5. It will be understood that it continues to rotate in this condition thereafter as long as it is undisturbed, the machine to which the stop motion is connected being held at rest with the driven shaft in a predetermined angular position. This angular position is that where the crank $a$ is held directly opposite the center $o^2$.

In the foregoing description it has been assumed that the various rollers $b^{20}$, $b^{21}$, and $z^{20}$, $z^{21}$, are properly located to secure the functions described. This is accomplished in the embodiment of the invention illustrated in the drawings by providing the finally acting rollers $z^{20}$ and $z^{21}$ at points of permanently fixed location in the machine, which do not change. The rollers $b^{20}$ and $b^{21}$ are, however, capable of being shifted, and for greater convenience are mounted on the same shifting control frame so that they always move together, or in unison. The shifting control frame is designated 29 in the various figures, and extends over a portion of the top of the casing so as to connect the pivot supports of the rollers $b^{20}$ and $b^{21}$. These pivot supports are formed of sliders 30 and 31 for the respective rollers $b^{20}$ and $b^{21}$, and the sliders are capable of vertical movement in vertical recesses 32 of the main frame. The slider 31 has an upper and lower part, (see Fig. 1), joined by a C-shaped yoke 31ˣ, which makes the parts an integral unit in line with one another. This makes a better guide and also a convenient connection for the cross-connecting frame 29 which extends over to the other slider 30. The whole result is to keep the sliders 30 and 31 in easy sliding engagement in their guides, and also make them work in unison. The rollers $b^{20}$ and $b^{21}$ are mounted on the sliders in such respective planes that the roller $b^{20}$ is entirely out of line with the cam $B^{20}$ when the roller $b^{21}$ is engaging its cam $B^{21}$, and conversely. It will be found, however, that the motion of translation of the driving shaft X from one axis to another results in preventing any improper interference between the cam wedges $B^{20}$ and $B^{21}$ and an improper one of the rollers $b^{20}$ and $b^{21}$. This will be perceived from a consideration of the action in Figs. 10 to 13 inclusive. Assuming that one of the rollers, say $b^{20}$ has been pushed down in Fig. 5, the result will be a shifting over of the cam unit W to the left in Fig. 5. The excursion to the left is only momentary, however, and there will be a return movement within about half a revolution. It is, however, not necessary for the roller $b^{20}$, which started the excursion, to be taken out of the way before this return movement of the cam unit, because in the meantime the cam unit has shifted over with the driving shaft X to the new axis $o^2$ and in this position the cam wedge $B^{20}$ is entirely out of any possible engagement with the roller $b^{20}$. The roller $b^{20}$ may, therefore, continue in the position to which it was shifted as long as desired. Meanwhile the driving shaft continues to run with the cam unit in its middle or normal position, and the driven shaft held at rest. In a similar way, when starting, it will be assumed that the frame 29 is lifted, which moves the roller $b^{21}$ into the path of engagement with the cam wedge $B^{21}$. This causes the cam unit to be shifted to the right in Fig. 5 for a brief interval corresponding to about half a revolution, after which it is returned to the middle position by the cam $Z^{21}$ engaging the roller $z^{21}$. But the roller $b^{21}$, which caused the excursion, does not have to be moved out of the way before the return of the cam unit because the cam unit is shifted over to the new axis $o'$ along with the driving shaft, and is, therefore, out of the way of any possible engagement with the roller $b^{21}$. The roller $b^{21}$ can, therefore, remain in its shifted position as long as desired while the machine is running normally in driving relation. To insure against a rather deliberate movement of the slider 29 having any harmful effect, the rollers $b^{20}$ and $b^{21}$ are situated in such respective planes that either one is necessarily brought out of a plane where it can contact with its cam before the other roller is brought into a plane where it can contact with its cam. This is clearly shown in Fig. 5. The movement of the control member 29 is limited by suitable stop plates 36, as most clearly shown in Figs. 5 and 8. These plates also assist in the guiding of the slides 11. The permanently located rollers $z^{20}$ and $z^{21}$ are merely loosely rotatable on fixed axial pins 37 driven into suitable holes in the main frame. The longitudinal position of the rollers $z^{20}$ and $z^{21}$ is determined by the recesses in which they are contained, without other provision, as shown in Figs. 5 and 8.

Figure 14:
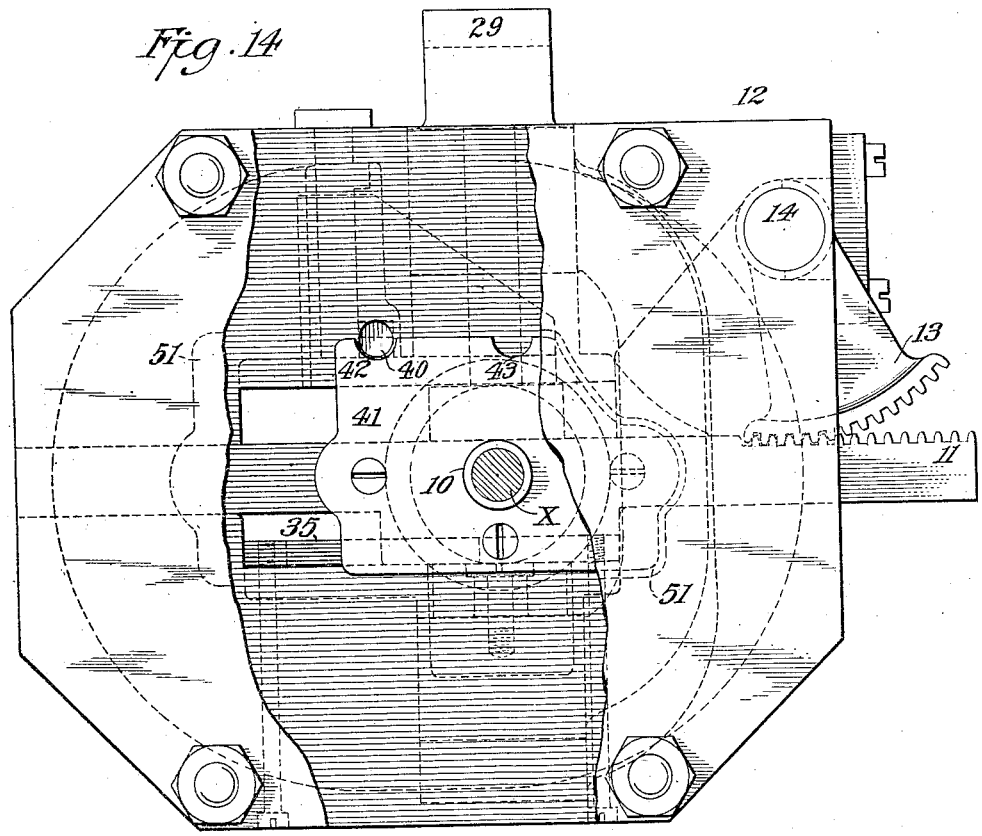
Fig. 14 is a side elevation, with the end plate partly broken away, from the pulley end of the machine.
Figure 16:
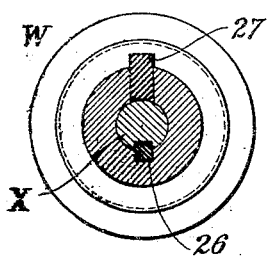
Fig. 16 is a section on the line XVI—XVI of Fig. 15 looking in the direction of the arrows.

The driving shaft X has no forces put upon it under normal conditions which are likely to displace it from either of its axes $o'$ or $o^2$ while running the driven shaft at speed or holding it at rest, respectively. However, it may be desirable in some cases to lock the driving shaft in its shifted position at each axis. Means are provided for this purpose, and in the best constructions embodying the invention comprise a locking pin 40 which is slidable in the main frame and locks the driving shaft at each limit of its movement of translation from one axis to another. One of the bearings 10 of the driving shaft has a notched plate 41 fixed thereto, which slides back and forth in unison with the driving shaft. The plate 41 is best shown in Fig. 14, wherein its notches 42 and 43 are also best illustrated. The locking bolt 40 is of such a length, and has a notch of such a character, as shown in dotted lines in Fig. 8, as to only engage the plate 41 when the cam unit W is at its middle or normal position, shown in Figs. 4 and 5. When the cam unit W is displaced to either side of this middle position the locking bolt is also displaced in one direction or the other, and in either case the plate 41 is released and free to move. This result is accomplished by securing the bolt 40 to move in unison with the cam unit W. From this construction it will be seen that the plate 41 and the driving shaft X are permanently held on either proper axis of rotation, while the machine is running normally, either constantly driving the driven shaft, or holding it at rest. It is only when the cam unit W has been shifted so that its respective cams 20 or 21 become effective to displace the driving shaft to a new axis that the driving shaft is unlocked and permitted to move to the new axis. The particular constructions for this purpose may vary, but, as illustrated, the cam unit W has a groove 45 which receives a plate 46 fixed to the bolt 40. For greater efficiency of guiding the bolt, the plate 46 is conveniently attached to a depending horn 47 of a slider 48 on top of the casing.

The construction as described is designed to secure a substantially oil-tight casing in which a quantity of grease may be provided and contained for a considerable period without requiring attention. The casing completely houses all the movable parts, and the limited number of openings actually provided are substantially secured against the egress of oil or grease. For example, the elongated exit opening 50 of the shaft X at the pulley end is sealed by the plate 41 which fits in recess 51, wherein it slides, so as to preclude the escape of the oil. At the other end the slotted opening 52 opens into a cavity 53, which contains the slotted link $x$ and crank $a$. But the bearing of the driven shaft A, which is a permanently located shaft, may be sealed as tightly as desired against egress of oil in any familiar way. An ordinary annular ball bearing 54 is illustrated as a convenient mounting for the driven shaft A. The control frame 29 emerges at the top of the casing, but not at the bottom, and gravity and the fit of the sliders 30 and 31 substantially prevents escape of oil or grease at the top of the casing. The elongated opening permitting the movement of the horn 47 is sealed by the slide 48. Thus, all openings of the casing are closed against escape of oil.

Inasmuch as the various details of operation have been described in connection with the elements of structure in the machine as these were presented, a brief recapitulation of the operation will only be required. Assuming that the machine is in the condition of Fig. 4, it will be noted that the driving and driven shafts are in alinement, and the driven shaft is being rotated at speed. Under these conditions a depression of the control frame 29 puts the roller $b^{20}$ into a position where it engages the wedge cam $B^{20}$ (see Fig. 10). The further rotation of the driving shaft X wedges the cam $B^{20}$ against the roller and thrusts the cam unit W to the left, so as to engage the cam 20 with its cheeks 16 and 17. This effects a stopping of the driven shaft, as seen by comparing the cam action of Figs. 10 and 11 with the diagram of Fig. 2. The driving shaft X is brought from the axis $o'$ to the axis $o^2$ in Fig. 2. This results in stopping the driven shaft, although the driving shaft continues to rotate as before. The driven shaft is not only stopped, but is brought gradually to rest, as already described, and with the freedom from shock and vibration and wear, as already described. It is furthermore locked and held in a definite angular position with its crank $a$ opposite the axis $o^2$. The subsequent starting is effected by the converse of the foregoing, namely, by lifting the control frame 29, which puts the roller $b^{21}$ in position to engage the cam $B^{21}$ (see Fig. 12). Under these conditions the rotation of the driving shaft X causes the cam wedge, $B^{21}$ to wedge against the roller $b^{21}$ and thrust the cam unit W to the right, or backwardly in Figs. 7, 12 and 13. This results in the engagement of the cam 21 with the cheeks or wear plates 18, 19, and thrusts the driving shaft from its axis $o^2$ to its axis $o'$, (see Fig. 2). The driving shaft continues to rotate on this axis and is coupled by rigid direct mechanical connections to the driven shaft A, which is thereby rotated at speed as long as desired. The locking bolt 40 coöperates with the plate 41 to lock the driving shaft on its respective axes. The remaining pair of cam wedges $Z^{20}$ and $Z^{21}$ coöperate with the rollers $z^{20}$, and $z^{21}$, as previously described, to restore the cam unit W to its middle position a suitable period after it has been shifted for the purposes just described.

The mechanism as a whole may be said to comprise a form of link connection between the driving and driven shafts, the two being at all times linked together, the links of the connection being, however, shiftable or changeable to different relations with one another. This is an important feature of the invention in that it affords a rigid and non-slipping connection, which is free from springs and also the uncertain effects of a slipping or brake engagement. In this way the power is transmitted with greatest effectiveness not only during the normal running conditions, but, as is still more important, during the changing conditions while the driven shaft is being brought from a condition of speed to a condition of rest, or vice versa. It is during this period that some of the greatest forces are generated by reason of the large effects of momentum and inertia, which have to be overcome. Hence, the importance of a mechanically rigid union at all times which will not let anything get away or get out of control, except by actual breakage of some of the parts of the machine. Of course, the machine parts may be made of steel strong enough to stand any strain put upon them, thus precluding failure from this cause. Thus, by virtue of the rigid mechanical connection, free from yielding or slipping, and established by a link arrangement between the driving and the driven shafts, it is possible to secure a greater certainty of action than would be had through any yielding or elastic devices, or any devices depending upon the slipping action of a brake.

What is claimed is:

1. In combination, a rotary driving shaft, a rotary driven shaft, and a transmitting means having rigid non-slipping mechanical connections for transmitting movement from one shaft to the other, and a stop mechanism comprising means adapted to be rendered operative at suitable times for altering the position of the connections to automatically change the speed ratio to effect a gradual reduction of the speed transmitted, from the full speed condition to a condition where the driven shaft is at rest.

2. In combination, a rotary driving shaft, a rotary driven shaft, and a transmitting means having rigid non-slipping mechanical connections for transmitting movement from one shaft to the other, and a stop mechanism comprising means adapted to be rendered operative at suitable times for altering the positions of the connections to automatically change the speed ratio to effect a gradual reduction of the speed transmitted, from the full speed condition to a condition where the driven shaft is held positively at rest in a predetermined angular position.

3. In a device of the class described, a first shaft, a second shaft, transmitting means for transmitting rotary movement from the first shaft to the second, and means adapted to be rendered operative at suitable times acting during the continuing rotation of the first shaft for automatically gradually shifting the parts of the transmitting means to a condition where the second shaft becomes and remains independently at rest.

4. In a device of the class described, a first shaft, a second shaft, transmitting means for transmitting rotary movement from the first shaft to the second, and means adapted to be rendered operative at suitable times acting during the continuing rotation of the first shaft for automatically gradually shifting the parts of the transmitting means through a definite range of movement, the transmitting means connected and arranged to gradually slow down the second shaft during such shifting movement of its parts.

5. In a device of the class described, a first shaft, a second shaft, transmitting means for transmitting rotary movement from the first shaft to the second, and means adapted to be rendered operative at suitable times acting during the continuing rotation of the first shaft for automatically gradually shifting the parts of the transmitting means through a definite range of movement, the transmitting means being connected and arranged to gradually slow down the second shaft during such shifting movement of its parts and further to stop and hold at rest said second shaft at a predetermined angular position at the conclusion of such shifting movement.

6. In combination, a rotary driving shaft, a rotary driven shaft, and a transmitting means having rigid non-slipping mechanical connections for transmitting movement from one shaft to the other, and a stop mechanism comprising means adapted to be rendered operative at suitable times for automatically altering the positions of the connections to effect a gradual reduction of the speed transmitted, from the full speed condition to a condition where the driven shaft is at rest, said altering means being actuated by the rotation of one of the shafts.

7. In combination, a rotary driving shaft a rotary driven shaft, and a transmitting means having rigid non-slipping mechanical connections for transmitting movement from one shaft to the other, and a stop mechanism comprising means adapted to be rendered operative at suitable times for automatically altering the positions of the connections to effect a gradual reduction of the speed transmitted, from the full speed condition to a condition where the driven shaft is at rest, said altering means being actuated by the rotation of the driving shaft.

8. In combination, a rotary driving shaft, a rotary driven shaft, and a transmitting means having rigid non-slipping mechanical connections for transmitting movement from one shaft to the other, and a stop mechanism comprising means adapted to be rendered operative at suitable times for automatically altering the positions of the connections to effect a gradual reduction of the speed transmitted, from the full speed condition to a condition where the driven shaft is at rest, the driven shaft being at all times rigidly controlled and held from the driving shaft by rigid non-slipping mechanical connections.

9. In combination, a rotary driving shaft, a rotary driven shaft, and a transmitting means having rigid non-slipping mechanical connections for transmitting movement from one shaft to the other, and a stop mechanism comprising means adapted to be rendered operative at suitable times for automatically altering the positions of the connections to effect a gradual reduction of the speed transmitted, from the full speed condition to a condition where the driven shaft is at rest, the driven shaft being at all times rigidly controlled and held from the driving shaft by rigid non-slipping mechanical connections, said altering means being actuated by the rotation of one of the shafts.

10. In combination, a rotary driving shaft, a rotary driven shaft, and a transmitting means having rigid non-slipping mechanical connections for transmitting movement from one shaft to the other, and a stop mechanism comprising means adapted to be rendered operative at suitable times for automatically altering the positions of the connections to effect a gradual reduction of the speed transmitted, from the full speed condition to a condition where the driven shaft is at rest, the driven shaft being at all times rigidly controlled and held from the driving shaft by rigid non-slipping mechanical connections, said altering means being actuated by the rotation of the driving shaft.

11. In combination, a rotary driving shaft, a rotary driven shaft, and a transmitting means having rigid non-slipping mechanical connections for transmitting movement from one shaft to the other, a stop mechanism comprising means adapted to be rendered operative at suitable times for automatically altering the positions of the connections to effect a gradual reduction of the speed transmitted, from the full speed condition to a condition where the driven shaft is at rest, said altering means being actuated by the rotation of one of the shafts, and means for controlling the last mentioned actuation during operations.

12. A stop motion for high speed machines comprising a driven shaft having a crank, a driving shaft movable into and out of a position coaxial with the driven shaft, and means on the driving shaft for shiftably engaging said crank.

13. A stop motion for high speed machines comprising a driven shaft having a crank, a driving shaft, means on the driving shaft for engaging said crank at varying radial distances from the driving shaft axis, and means for shifting the driving shaft into and out of coaxial relation with the driven shaft.

14. A stop motion for high speed machines comprising a driven shaft having a crank, a driving shaft, means on the driving shaft for engaging said crank at varying radial distances from the driving shaft axis, means for holding the driving shaft in alinement with the driven shaft, and controlling means for causing a shift of the driving shaft to a new axis.

15. A stop motion for high speed machines comprising a driven shaft having a crank, a driving shaft, means on the driving shaft for engaging said crank at varying radial distances from the driving shaft axis, means for holding the driving shaft in alinement with the driven shaft, and controlling means for causing a shift of the driving shaft to a new axis where it is located opposite the rotative path of said crank.

16. A stop motion for high speed machines comprising a driven shaft having a crank, a driving shaft, means on the driving shaft for engaging said crank at varying radial distances from the driving shaft axis, means for holding the driving shaft axis opposite the rotative path of said crank, and controlling means for causing a shift of the driving shaft to a new axis.

17. A stop motion for high speed machines comprising a driven shaft having a crank, a driving shaft, means on the driving shaft for engaging said crank at varying radial distances from the driving shaft axis, means for holding the driving shaft axis opposite the rotative path of said crank, and controlling means for causing a shift of the driving shaft to a new axis coaxial with the driven shaft.

18. A stop motion for high speed machines comprising a driven shaft having a crank, a driving shaft, means on the driving shaft for engaging said crank at varying radial distances from the driving shaft axis, means for moving the driving shaft opposite the driven shaft, and means for moving the driving shaft opposite the rotative path of said crank.

19. A stop motion for high speed machines comprising a driven shaft having a crank, a driving shaft, means on the driving shaft for engaging said crank at varying radial distances from the driving shaft axis, and means for shifting said driving shaft to and fro, between a position opposite the driven shaft and a position opposite the rotative path of said crank.

20. A stop motion for high speed machines comprising a driven shaft having a crank, a driving shaft, means on the driving shaft for engaging said crank at varying radial distances from the driving shaft axis, and means coördinated to the rotation of the driving shaft for shifting said driving shaft to and fro, between a position opposite the driven shaft and a position opposite the rotative path of said crank.

21. A stop motion for high speed machines comprising a driven shaft having a crank, a driving shaft, means on the driving shaft for engaging said crank at varying radial distances from the driving shaft axis, and means in predetermined time relation with the rotative movement of the driving shaft for shifting said driving shaft to and fro between a position opposite the driven shaft and a position opposite the rotative path of said crank.

22. A stop motion for high speed machines comprising a driven shaft having a crank, a driving shaft, means on the driving shaft for engaging said crank at varying radial distances from the driving shaft axis, and means acting during substantially a quarter turn of the driving shaft for shifting said driving shaft from a position opposite said crank to a position coaxial with the driven shift, whereby the driven shaft is brought gradually from a condition of rest to a movement in unison with the driving shaft.

23. A stop motion for high speed machines comprising a driven shaft having a crank, a driving shaft, means on the driving shaft for engaging said crank at varying radial distances from the driving shaft axis, and means acting during substantially a quarter turn of the driving shaft for shifting said driving shaft from a position coaxial with the driven shaft to a position opposite said crank, whereby the driven shaft is brought gradually from a condition of motion in unison with the driving shaft to a condition of rest.

24. A stop motion for high speed machines comprising a driven shaft having a crank, a driving shaft, means on the driving shaft for engaging said crank at varying radial distances from the driving shaft axis, and means acting during substantially a quarter turn of the driving shaft for shifting said driving shaft within a fixed path from a position coaxial with the driven shaft to a position opposite said crank, whereby the driven shaft is brought gradually from a condition of motion in unison with the driving shaft to a condition of rest at a predetermined stopping position.

25. A stop motion for high speed machines comprising a driven shaft having a crank, a driving shaft, means on the driving shaft for engaging said crank at varying radial distances from the driving shaft axis, and controlling means for causing an automatic shift of the driving shaft, between a position opposite the driven shaft and a position opposite the rotative path of said crank.

26. A stop motion for high speed machines comprising a driven shaft having a crank, a driving shaft, means on the driving shaft for engaging said crank at varying radial distances from the driving shaft axis, and controlling means for causing an automatic shift of the driving shaft in predetermined time relation with the rotative movement thereof, between a position opposite the driven shaft and a position opposite the rotative path of said crank.

27. A stop motion for high speed machines comprising a driven shaft having a crank, a driving shaft, means on the driving shaft for engaging said crank at varying radial distances from the driving shaft axis, and controlling means for causing an automatic shift of the driving shaft in predetermined time relation with the rotative movement thereof, between a position opposite the driven shaft and a position opposite the rotative path of said crank.

28. A stop motion for high speed machines comprising a driven shaft having a crank, a driving shaft, means on the driving shaft for engaging said crank at varying radial distances from the driving shaft axis, and controlling means for causing an automatic shift of the driving shaft from a position opposite the crank to a position coaxial with the driven shaft, whereby the driven shaft is brought gradually from a condition of rest to a movement in unison with the driving shaft.

29. A stop motion for high speed machines comprising a driven shaft having a crank, a driving shaft, means on the driving shaft for engaging said crank at varying radial distances from the driving shaft axis, and controlling means for causing an automatic shift of the driving shaft from a position coaxial with the driven shaft to a position opposite said crank, whereby the driven shaft is brought gradually from a condition of motion in unison with the driving shaft to a condition of rest.

30. A stop motion for high speed machines comprising a driven shaft having a crank, a driving shaft, means on the driving shaft for engaging said crank at varying radial distances from the driving shaft axis, and controlling means for causing an automatic shift of the driving shaft within a fixed path from a position coaxial with the driven shaft to a position opposite said crank, whereby the driven shaft is brought gradually from a condition of motion in unison with the driving shaft to a condition of rest at a predetermined stopping position.

31. In combination, a rotary driving shaft, a rotary driven shaft, a transmitting means having rigid non-slipping mechanical connections for transmitting movement from one shaft to the other, and mechanism comprising means adapted to be rendered operative at suitable times for automatically altering the positions of the connections to a condition where power is transmitted at slower speed from the driving to the driven shaft, but still through rigid non-slipping mechanical connections.

32. In combination, a rotary driving shaft, a rotary driven shaft, a transmitting means having rigid non-slipping mechanical connections for transmitting movement from one shaft to the other, and mechanism comprising means adapted to be rendered operative at suitable times for gradually altering the positions of the connections through an indefinite number of varying conditions where power is progressively transmitted at slower and slower speeds from the driving to the driven shaft, but always through rigid non-slipping mechanical connections.

33. In combination, a rotary driving shaft, a rotary driven shaft, a transmitting means having rigid non-slipping mechanical connections for transmitting movement from one shaft to the other, mechanism comprising means adapted to be rendered operative at suitable times for gradually altering the positions of the connections through an indefinite number of varying conditions where power is progressively transmitted at slower and slower speeds from the driving to the driven shaft, but always through rigid non-slipping mechanical connections, and controlling means for automatically causing such altering of the positions of the parts during operations.

34. In combination, a driving and a driven shaft, a link motion having rigid non-slipping mechanical connections for transmitting movement from one shaft to the other, means adapted to be rendered operative at suitable times for altering the positions of the links to a condition where power is transmitted at slower speed from the driving to the driven shaft, but still through rigid non-slipping mechanical connections, and controlling means for automatically causing such altering of the positions of the parts during operations.

35. In a device of the class described, a rotary driving shaft, a rotary driven shaft, a mechanism for transmitting motion from one shaft to another, means adapted to be rendered operative at suitable times and automatically operative during rotation for changing the adjustment of the mechanism to terminate the movement of the driven shaft, and means for locking the parts in different positions.

36. In a device of the class described, a rotary driving shaft, a rotary driven shaft, a mechanism adjustable to a condition for transmitting motion from one shaft to another, means adapted to be rendered operative at suitable times for locking the parts in such condition, and means for unlocking and changing automatically during rotation the adjustment of the parts to terminate the movement of the driven shaft, and relocking the parts.

37. In a device of the class described, a rotary driving shaft, a rotary driven shaft, a mechanism for transmitting motion from one shaft to another, means adapted to be rendered operative at suitable times and automatically operative during rotation for changing the adjustment of the mechanism to terminate the movement of the driven shaft, means for locking the parts in the latter relation, and means for unlocking and changing back the positions of the parts and relocking the parts in the first mentioned relation.

38. In a device of the class described, a driving and a driven shaft, a shifting part for changing the relations between said shafts, and a cam for shifting said part, said cam having two substantial quadrants with a center at one point on the cam, and a curve of smaller angular extent with a center at another point on the cam.

39. In a device of the class described, a driving and a driven shaft, a shifting part for changing the relations between said shafts, and a cam for shifting said part, said cam having two substantial quadrants with a center at one point on the cam, and a curve of smaller angular extent with a center at another point on the cam, said cam having its axis of rotation at a third point 40. In a device of the class described, a driving and a driven shaft, a shifting part for changing the relations between said shafts, and a cam for shifting said part, said cam having two substantial quadrants with a center at one point on the cam, and a curve of smaller angular extent with a center at another point on the cam, said cam having its axis of rotation at a third point forming the major acute angle vertex of a right triangle having its other angles on the first mentioned points.

41. In a device of the class described, a driving and a driven shaft, a shifting part for changing the relations between said shafts, and a cam for shifting said part, said cam having two substantial quadrants with a center at one point on the cam, and a curve of smaller angular extent with a center at another point on the cam, said cam having its axis of rotation at a third point forming the major acute angle vertex of a right triangle having its other angles on the first mentioned points, the right angle being the center of the two quadrants.

42. In a device of the class described, a driving and a driven shaft, a shifting part for changing the relations between said shafts, and a cam for shifting said part, said cam having two substantial quadrants with a center at one point on the cam, and a curve of smaller angular extent with a center at another point on the cam, said cam having its axis of rotation at a third point forming the major acute angle vertex of a right triangle having its other angles on the first mentioned points, the right angle being the center of the two quadrants, the said cam further having an additional short radius curve concentric with the minor acute angle of said triangle and merging into tangency with one of said quadrants.

43. In a device of the class described, a driving and a driven shaft, a shifting part for changing the relations between said shafts, and a cam for shifting said part, said cam having two substantial quadrants with a center at one point on the cam, and a curve of smaller angular extent with a center at another point on the cam, said cam having its axis of rotation at a third point forming the major acute angle vertex of a right triangle having its other angles on the first mentioned points, the right angle being the center of the two quadrants, the said cam further having an additional short radius curve concentric with the minor acute angle of said triangle and merging into tangency with one of said quadrants, and a concentric portion also merging into tangency with this same quadrant.

44. In a device of the class described, a driving and a driven shaft, a shifting part for changing the relations between said shafts, a cam for shifting said part, said cam having two substantial quadrants with a center at one point on the cam, a curve of smaller angular extent with a center at another point on the cam, and parallel faced cheeks or wear plates between which the cam is mutually engaged at all times during its actual shifting movement on said part.

45. In a device of the class described, a driving and a driven shaft, a shifting part for changing the relations between said shafts, a cam for shifting said part, said cam having two substantial quadrants with a center at one point on the cam, a curve of smaller angular extent with a center at another point on the cam, said cam having its axis of rotation at a third point, and parallel faced cheeks or wear plates between which the cam is mutually engaged at all times during its actual shifting movement on said part.

46. In a device of the class described, a driving and a driven shaft, a shifting part for changing the relations between said shaft, a cam for shifting said part, said cam having two substantial quadrants with a center at one point on the cam, a curve of smaller angular extent with a center at another point on the cam, said cam having its axis of rotation at a third point forming the major acute angle vertex of a right triangle having its other angles on the first mentioned points, and parallel faced cheeks or wear plates between which the cam is mutually engaged at all times during its actual shifting movement on said part.

47. In a device of the class described, a driving and a driven shaft, a shifting part for changing the relations between said shafts, a cam for shifting said part, said cam having two substantial quadrants with a center at one point on the cam, a curve of smaller angular extent with a center at another point on the cam, said cam having its axis of rotation at a third point forming the major acute angle vertex of a right triangle having its other angles on the first mentioned points, the right angle being the center of the two quadrants, and parallel faced cheeks or wear plates between which the cam is mutually engaged at all times during its actual shifting movement on said part.

48. In a device of the class described, a driving and a driven shaft, a shifting part for changing the relations between said shafts, a cam for shifting said part, said cam having two substantial quadrants with a center at one point on the cam, a curve of smaller angular extent with a center at another point on the cam, said cam having its axis of rotation at a third point forming the major acute angle vertex of a right triangle having its other angles on the first mentioned points, the right angle being the center of the two quadrants, the said cam further having an additional short radius curve concentric with the minor acute angle of said triangle and merging into tangency with one of said quadrants, and parallel faced cheeks or wear plates between which the cam is mutually engaged at all times during its actual shifting movement on said part.

49. In a device of the class described, a driving and a driven shaft, a shifting part for changing the relations between said shafts, a cam for shifting said part, said cam having two substantial quadrants with a center at one point on the cam, a curve of smaller angular extent with a center at another point on the cam, said cam having its axis of rotation at a third point forming the major acute angle vertex of a right triangle having its other angles on the first mentioned points, the right angle being the center of the two quadrants, the said cam further having an additional short radius curve concentric with the minor acute angle of said triangle and merging into tangency with one of said quadrants, and a concentric portion also merging into tangency with this same quadrant, and parallel faced cheeks or wear plates between which the cam is mutually engaged at all times during its actual shifting movement on said part.

50. In a device of the class described, a driving and a driven shaft, a part for changing the relations between said shafts, a cam for shifting said part, and means for moving the cam endwise to engage it in such shifting relation.

51. In a device of the class described, a driving and a driven shaft, a part for changing the relations between said shafts, a cam for shifting said part, means for moving the cam endwise to engage it in such shifting relation, and means for locking said part in each of its shifted relations.

52. In a device of the class described, a driving and a driven shaft, a part for changing the relations between said shafts, a cam for shifting said part, means for moving the cam endwise to engage it in such shifting relation, and means operated by the endwise movement of said cam for locking said part in each of its shifted relations.

53. In a device of the class described, a driving and a driven shaft, a part for changing the relations between said shafts, a cam for shifting said part, means for moving the cam endwise to engage it in such shifting relation, and means operated by the endwise movement of said cam for automatically locking and unlocking said part to hold it in fixed location during both the normal running and stopped relations of the driven shaft, and permitting movement of said part when shifted by said cam.

In testimony whereof, I have affixed my signature.

ALFRED W. PROCTOR.